United States Patent [19]

Reinhard

[11] Patent Number: 4,964,602

[45] Date of Patent: Oct. 23, 1990

[54] DRIVE SCREW EYE OR HOOK

[76] Inventor: Timothy D. Reinhard, 2514 Jackson Ave., Evanston, Ill. 60201

[21] Appl. No.: 369,747

[22] Filed: Jun. 22, 1989

[51] Int. Cl.$^5$ ............................................. F16B 23/00
[52] U.S. Cl. ................................ 248/217.4; 248/497; 411/402
[58] Field of Search ...................... 248/217.4, 497, 498; 411/400–410

[56] References Cited

U.S. PATENT DOCUMENTS

| | | | |
|---|---|---|---|
| D. 254,707 | 4/1980 | Einhorn | D8/367 |
| D. 293,079 | 2/1884 | Pope | |
| 350,209 | 10/1886 | Parmelee | 411/400 |
| 356,721 | 1/1887 | Leber et al. | 411/401 X |
| 377,611 | 2/1888 | Harley | 411/403 X |
| 603,891 | 5/1898 | Cassil | 411/403 X |
| 1,015,890 | 1/1912 | Hyde | 411/398 |
| 1,188,305 | 6/1916 | Noerteman | 411/409 |
| 1,365,508 | 1/1921 | Kucewicz | |
| 2,076,041 | 4/1937 | Payne | 411/410 |
| 3,895,773 | 7/1975 | Solo | 411/394 X |
| 4,073,210 | 2/1978 | Totsu | 411/404 |

Primary Examiner—Alvin C. Chin-Shue
Attorney, Agent, or Firm—Timothy T. Patula

[57] ABSTRACT

A support device or fastener comprised of a shank having a threaded end adapted to be driven into a member for securing the shank within the member and having a support end. A cavity or protrusion drive receiving configuration is configured to the support end of said shank in order to be rotated by a drive force element in order to drive the support device into a member or surface. The support device may be configured with a phillips, spline, multiple spline, torx, hex or square cavity or protrusion or by other conventional configurations which is configured on a ring, open hook, "L"-shaped or other configuration.

14 Claims, 1 Drawing Sheet

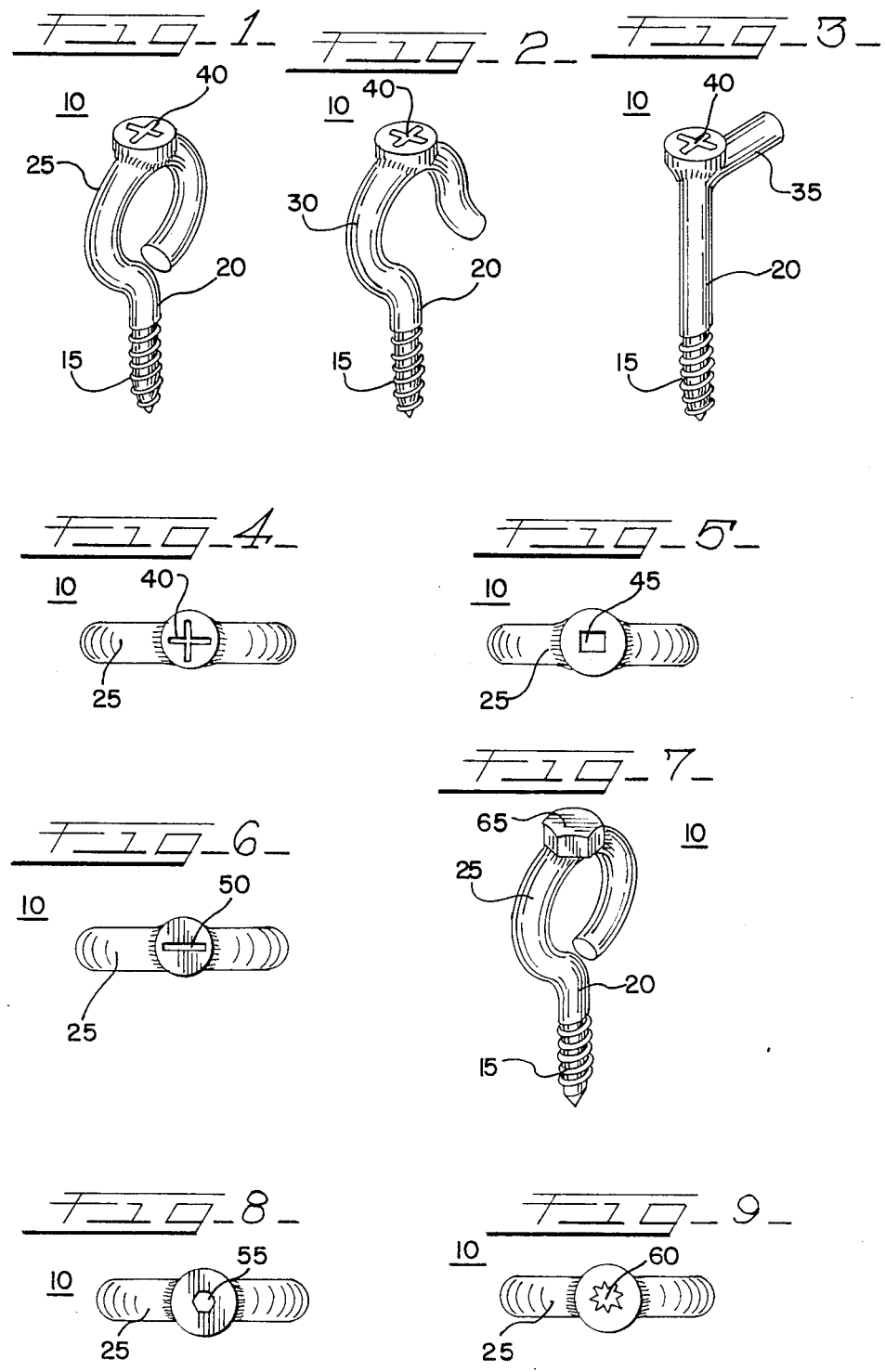

DRIVE SCREW EYE OR HOOK

The present invention relates to a fastening apparatus in which a conventional drive formation is formed on the end of either a screw eye or hook. The drive formation on one end allows the installation of the eye or hook with an electric screwdriver or by hand at a high rate of speed and efficiency.

BACKGROUND OF INVENTION

Various screws and mounting devices have been known in the past and have been known as the footing for modern society to build, attach or fasten devices together. For example, shown in Kucewicz U.S. Pat. No. 1,365,508 entitled "Screw" and issued on Jan. 11, 1921 is a fastener having a screw on one end which provides an improved means for supporting a hook hanger or the like on the other end. However, such devices are cumbersome to install or remove unlike the present invention.

The design patent to Einhorn, Des. Pat. No. 254,707 issued on Apr. 15, 1980 depicts the ornamental design for a hook with fastening device through a solid surface. Such a hook likewise has no easy method of installation.

Various screws, hooks or eyes are disclosed in U.S. Pat. No. 293,079 patented on Feb. 5, 1884 to Pope, each having various eye hooks which are either open or closed and other fastening devices, none of which could be readily installed or removed like the present invention.

The present invention is an improvement in the construction of a fastening device of the type being a hook or ring which by its screwshank, may be secured at any desired point. No known device discloses the present invention's drive receiving means on its end. No patent or device is known to disclose the present invention and its ability to adequately fasten or hold two components together and be readily installed or removed by a quick means. In the past, a screw eye or hook, open hook or L-shaped hook had to be inserted by hand, pliers or some other grabbing tool or by the cumbersome insertion of a tool within the fastening device and very inefficiently rotated into the surface or member.

Applicant's invention provides advantages over previous fasteners in that it allows ring, hook or "L"-shaped fasteners to be driven and inserted by the use of either Phillips, Robertson, Allen or Hex or Torx type drivers as well as straight and others in order to accurately drive the desired fastener into the desired surface.

The fastener of present invention has a further advantage of being operable in areas of close clearances.

Numerous other advantages and features of the invention will become readily apparent from the following detailed description other than the preferred embodiment of the invention, from the claims and from the accompanying drawings, in which like numerals are employed to designate like parts throughout the same.

BRIEF SUMMARY OF THE INVENTION

A fastening device such as screw eye, open hook or L-shaped hook has mounted at one end either a Phillips, Robertson, Allen or Hex or Torx or straight head drive formation fastened at the tip thereto and is dimensioned in such a way as when driven by the appropriate driving tool it rotates said fastener to mount or remove the same to or from the desired surface.

BRIEF DESCRIPTION OF THE DRAWINGS

A fuller understanding of the foregoing may be had by reference to the accompanying drawings, wherein:

FIG. 1 is a perspective view of a screw eye constructed in accordance with one of the preferred embodiments of the present invention;

FIG. 2 is a perspective view of an open hook constructed in accordance with one of the preferred embodiments of the present invention;

FIG. 3 is a perspective view of an L-shaped book;

FIG. 4 is a top view of a phillips head embodiment constructed in accordance with one of the preferred embodiments of the present invention;

FIG. 5 is a top view of one of the fastening devices having a Robertson head as one of the embodiments of the present invention;

FIG. 6 is a top view of one of the fastening devices having a straight head as one of the embodiments of the present invention;

FIG. 7 is a perspective view of hex protrusion as one of the embodiments of the present invention.

FIG. 8 is a top view of one of the fastening devices having a Allen or Hex head as one of the embodiments of the present invention; and FIG. 9 is a top view of one of the fastening devices having a Torx head as one of the embodiments of the present invention.

DETAILED DESCRIPTION OF THE INVENTION

While the invention is susceptible of embodiment in many different forms, there is shown in the drawings and will herein be described in detail a numbered preferred embodiments of the invention. It should be understood however, that the present disclosure is to be considered as only an exemplification of the principals of the invention and is not intended to limit the spirit and scope of the invention and/or claims to the embodiments illustrated.

Referring now to figures, the numeral 10 indicates generally the fastening device of the present invention. Fastening device 10 as shown in FIGS. 1, 2 and 3 and have a threaded end 15 which is configured to be threaded into, upon rotation, a flat surface or member for securing shank portion 20 therewithin. Shank portion 20 is configured to a ring or screw eye portion 25 in FIGS. 1 and 7; an open hook portion 30 in FIG. 2; a "L"-shaped or leg shaped portion 35 in FIG. 3. Configured upon eye portion 25 in FIGS. 1 and 4, open hook portion 30 in FIG. 2; and leg shaped portion 35 in FIG. 3, is a drive receiving means 40 which is configured as phillips head or multiple spline configuration 40.

A conventional rotating drive means such as a screw driver or mechanically rotating bit is adapted to cooperatively rotate multiple spline configuration 40 thereby rotating eye portion 25 3 or open hook 30 or leg 35 respectively and thereby shank portion 20 and threaded end 15 for insertion into a member or flat surface.

FIG. 5 depicts a square configuration torquing cavity 45 configured on portion 25. In FIG. 6 a single spline slot configuration torquing cavity 50 is configured on portion 25. In FIG. 8, a hex configuration torquing cavity 55 is configured on portion 25. In FIG. 9, a torx configuration torquing cavity 60 is configured on portion 25. In FIG. 7, a hex configuration torquing protrusion 65 is configured on portion 25.

In each of the various embodiments shown in the drawing figures and described above, a support device or fastener 10 is comprised of a threaded shank 20 connected to a support end having a conventional drive receiving means configured to the support end 25, 30, 35 of the shank opposite the threaded portion 15. The drive receiving means 40, 45, 50, 55, 60, 65 be it a torquing protrusion or cavity receives a conventional drive force element of a screwdriver, socket wrench, drive socket element, rachet or other mechanical means to drive the support device 10 into a member such as a wall, ceiling, floor or other surface. The present invention obviates the need for various cumbersome means of trying to rotate an open or closed hook or "L"-shaped fastener with a makeshift method of rotating the fastener. The adaption of the present invention's driving means whether it be a torquing cavity or protrusion by a powered device or even by hand provides great speed and assistance in the mounting and removal of these fastening devices.

While the foregoing has presented certain specific embodiments of the present invention, it is to be understood that these embodiments have been presented by way of example only. For example it is intended and claimed that many combinations of cavity and/or protrusion configurations may be configured on various shaped conventional fasteners now known or in the future. It is expected that others will perceive differences which, while bearing from the foregoing do not depart from the spirit and scope of the invention herein described and claimed.

What is claimed is:

1. A support device, comprising:
   a shank having a threaded end adapted to be driven into a member for securing said shank therewithin, and having a circular configuration and integral with said shank;
   torquing protrusion integral with said circular configuration end and aligned with the outside circumference of the longitudinal axis of said shank which bisects said circular configuration end; and
   said torquing protrusion having at least one torquing cavity for receiving a torquing tool.

2. The support device recited in claim 1, wherein said torquing cavity is a single spline slot.

3. The support device recited in claim 1, wherein said torquing cavity are multiple spline slots.

4. The support device recited in claim 1, wherein said torquing cavity is a hexagonal.

5. The support device recited in claim 1, wherein said torquing cavity is a square.

6. A support device, comprising:
   a shank having a threaded end adapted to be driven into a member for securing said shank therewithin, and having a circular configuration end integral with said shank;
   torquing protrusion integral with the outside circumference of said circular configuration end and aligned with the longitudinal axis of said shank which bisects said circular configuration end; and
   said torquing protrusion having at least three flat side walls adapted for receiving a torquing tool.

7. The support device recited in claim 2, wherein said torquing protrusion is a hexagonal.

8. A support device, comprising:
   a shank having a threaded end adapted to be driven into a member for securing said shank therewithin, and having a ring end integral with said shank;
   torquing protrusion integral with the outside circumference of said ring end and aligned with the longitudinal axis of said shank which bisects said ring end; and
   said torquing protrusion having at least one torquing cavity for receiving a torquing tool.

9. The support device recited in claim 8, wherein said torquing cavity is a single spline slot.

10. The support device recited in claim 8, wherein said torquing cavity are multiple spline slots.

11. The support device recited in claim 8, wherein said torquing cavity is a hexagonal.

12. The support device recited in claim 8, wherein said torquing cavity is a square.

13. A support device, comprising:
    a shank having a threaded end adapted to be driven into a member for securing said shank therewithin, and having a ring end integral with said shank;
    torquing protrusion integral with the outside circumference of said ring end and aligned with the longitudinal axis of said shank which bisects said ring end; and
    said torquing protrusion having at least three flat side walls adapted for receiving a torquing tool.

14. The support device recited in claim 13, wherein said torquing protrusion is a hexagonal.

* * * * *